Figure 1:
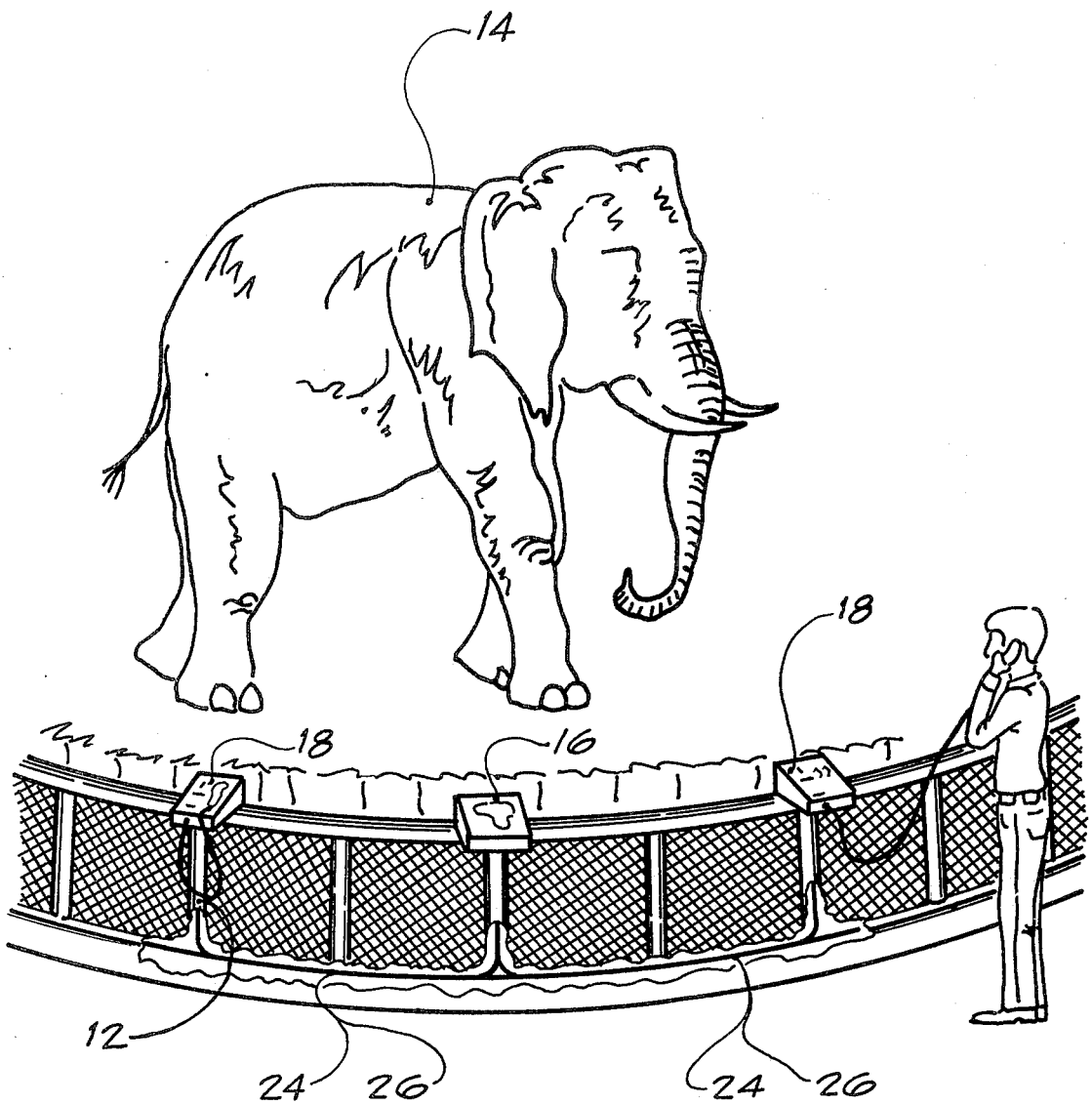

United States Patent [19]

Fial et al.

[11] 3,960,254  
[45] June 1, 1976

[54] AUDIO INFORMATION DEVICE

[75] Inventors: Ronald Augustine Fial, Milwaukie; Hal Markowtiz, Portland, both of Oreg.

[73] Assignee: Portland Zoological Society, Portland, Oreg.

[22] Filed: Apr. 3, 1975

[21] Appl. No.: 564,634

[52] U.S. Cl. .................................. 194/9 T; 360/69; 194/15; 35/8 R
[51] Int. Cl.[2] .......................................... G07F 5/10
[58] Field of Search ............... 194/9 R, 9 T, 15, 31, 194/DIG. 18; 179/100.1 C, 100.1 DR; 360/12, 71, 74, 61, 69; 35/8; 40/28.1, 28.3

[56] References Cited
UNITED STATES PATENTS

| | | | |
|---|---|---|---|
| 2,782,529 | 2/1957 | Shinn | 194/15 |
| 2,799,731 | 7/1957 | Straub | 179/100.1 C |
| 2,960,577 | 11/1960 | Pray et al. | 179/100.1 C |
| 3,419,687 | 12/1968 | Stewart | 179/100.1 C |
| 3,707,213 | 12/1972 | Larre | 194/15 |

*Primary Examiner*—Robert B. Reeves
*Assistant Examiner*—H. Grant Skaggs
*Attorney, Agent, or Firm*—Robert L. Harrington

[57] ABSTRACT

A tape playback unit is designed to transmit messages recorded on an endless loop dual channel recording tape. The tape contains a series of independent messages recorded on one channel and stop-start signals coordinated with the beginning and end of each message on the other channel. A multiple of receiving units each having an audio receiver as in a telephone receiver, hereafter referred to as an earphone, are connected to said playback unit and the independent messages contained on the tape are transmitted to the earphones. A control unit associated with each receiving unit intercepts the message being transmitted by the playback unit and permits transmitting thereof to the earphone only upon activation of a switch associated with the receiving unit, e.g. activated by a coin. The control unit further includes a timer associated with detecting means for detecting the beginning and end of each message, i.e. it detects the stop-start signals on said other channel. The earphone receives transmission only after the switch is activated and the start of a sentence is detected and ends only after the timer signals completion of the timing cycle and the end of a sentence is detected.

4 Claims, 4 Drawing Figures

AUDIO INFORMATION DEVICE

HISTORY

This invention relates to an audio information device such as used in displays, e.g. zoos and the like, wherein by activating a switch on a receiving unit a message is conveyed to viewers of the display.

Audio information devices are in common use in various types of public displays such as zoos. Most commonly the audio information device consists of a simple playback recorder which transmits a message to the viewing audience through a loud speaker. It is also common that the recorder and message transmission is activated by a switch, often coin or key operated. These known audio information devices have several disadvantages. For example, other viewers of the display or even of neighboring displays may not be interested in hearing the message being transmitted and the broadcast in such instances is detrimental to their enjoyment of the display. Also, if the audio information devices are intended to be profitable, it is desirable to collect some fee from the entire audience benefiting from the broadcast. The loud speaker form of transmission permits an entire audience, regardless of size, to benefit from a single transmission activated, e.g. by a coin deposit. If an earphone is used to receive the information, only one person can hear the message at a time and many potential users of the device are denied that use. Also, a single display such as an exotic animal in a zoo may be the subject of much information that is of interest. All of the information may be desired by an individual viewer or only part of it. A small payment may be too cheap for the entire message while a larger payment too costly for the viewer wanting less than all the information. Also, the more information that is recorded the less frequent the use and, if earphones are used, the greater the tie-up and longer the wait and, consequently, the greater the number of potential users being denied.

BRIEF DESCRIPTION

The present invention is believed to substantially advance the state of the art in audio information devices such as used in association with public displays by overcoming the disadvantages described above. In the present invention, the information provided on a continuous loop recording tape includes a series of independent messages all having reference to a particular display. The recording is made on a dual channel tape with the parallel channel carrying information as to the beginning and end of each message. A single playback unit transmitting the dual messages is adapted to transmit to a multiple of receiving units. Each receiving unit is equipped with control means whereby upon activation of a switch, e.g. by depositing a coin into a receiving slot, a timer is engaged and in conjunction with the start-stop signal being transmitted from one of the tape channels, the transmission of the message on the other channel is conveyed to the earphone of that receiving unit. Upon completion of the timing cycle and the subsequent detection of the "end of message" start-stop signal, transmission is stopped. Repeated activation, i.e., depositing additional coins, will repeat the sequence, but picking up other of the messages contained on the tape.

Figure 2A:
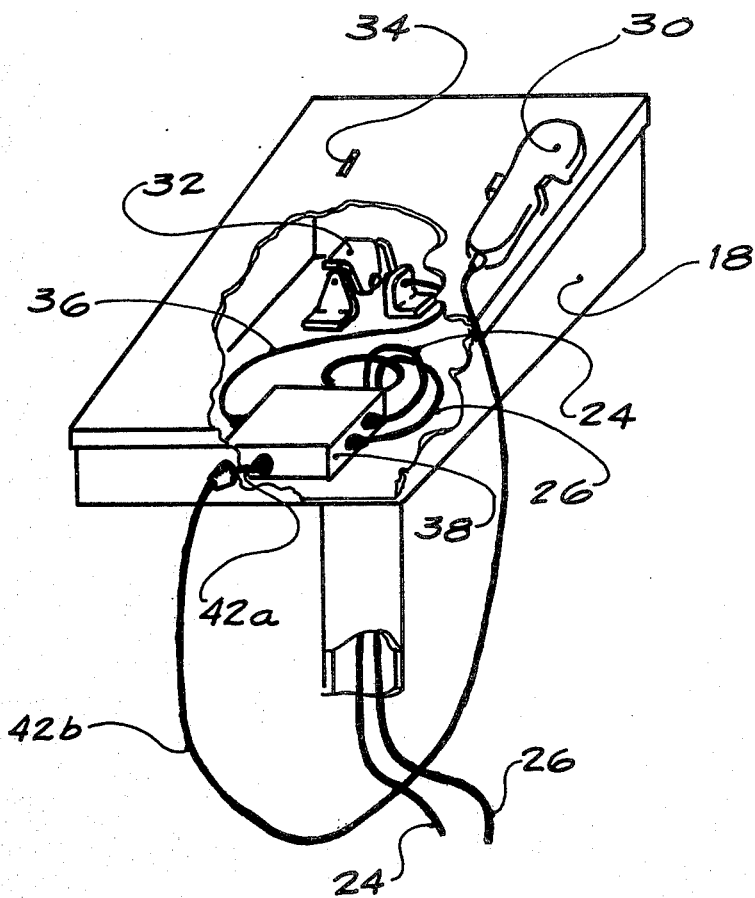
Figure 2B:
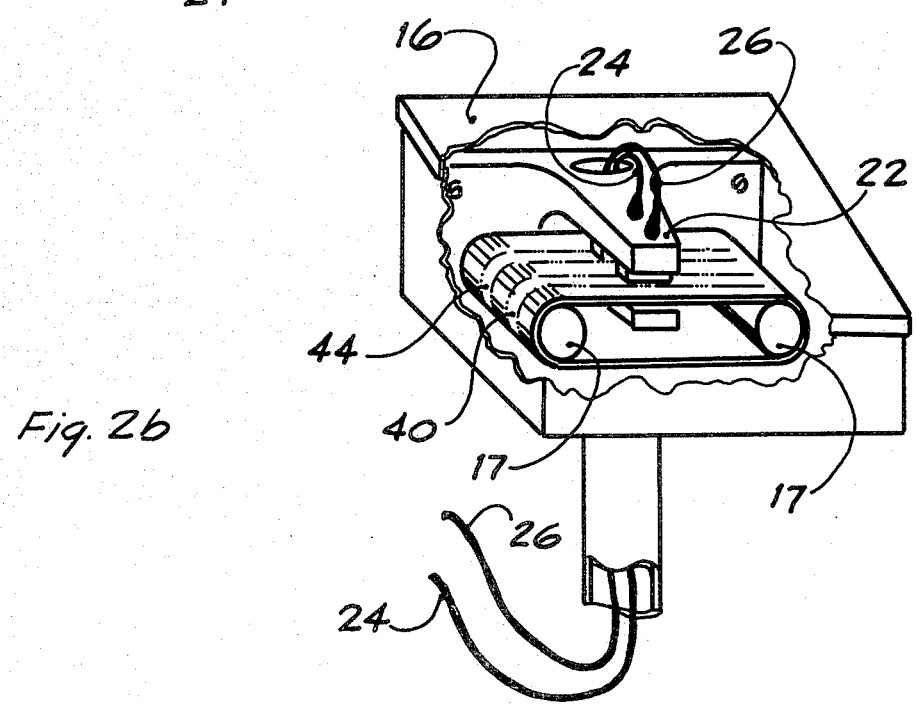
Figure 3:
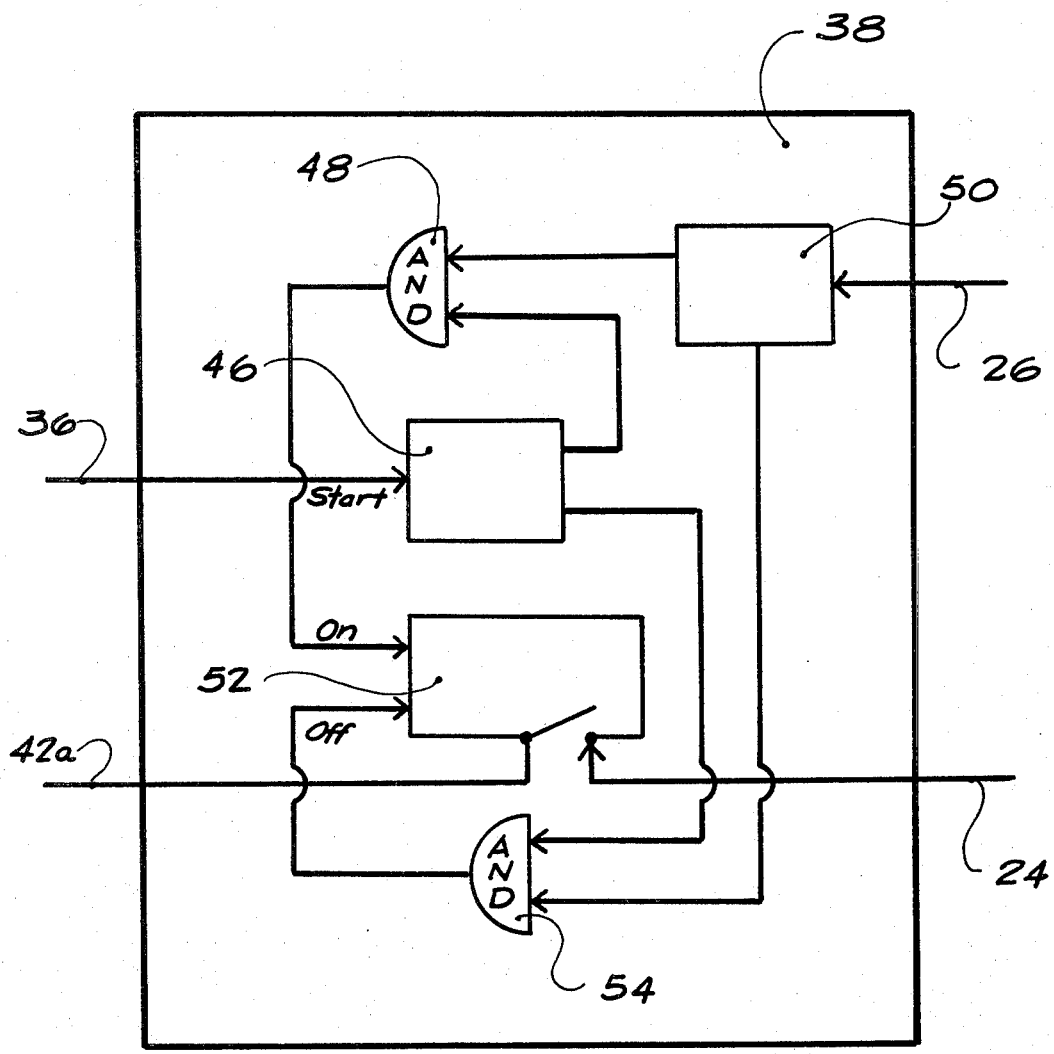

Whereas the invention has been briefly described above, a more detailed understanding will be received by reference to the following detailed description and drawing wherein:

FIG. 1 is a representation of an audio information device incorporating the present invention illustrated in use at an animal display in a zoo;

FIGS. 2a and 2b respectively illustrate a receiving unit and the play back unit of the audio information device shown in FIG. 1; and FIG. 3 is a schematic diagram of the electronics for the control unit in the receiving unit of FIG. 2a.

Referring to FIG. 1 of the drawing, an audio information device 10 is provided at a viewer station 12 in front of a display 14. The audio information device consists of a playback unit 16 and a multiple of receiving units 18. As especially viewed in FIG. 2, the playback unit 16 includes drive means 17 for driving an endless loop tape 20. Messages recorded on the tape are picked up by a magnetic tape readout head 22. The readout head 22 is provided with transmitting lines 24 and 26 that transmit the messages from the readout head 22 to the receiving units 18. The electronics and specific drawings of components for the playback unit are not specifically shown, in that it is well within the state of the art to provide suitable playback units having the stated capabilities. The on-off switch to activate the playback unit may be provided in a number of ways. It might simply be an on-off switch located on the playback unit. In this case the unit is continuously run during the times when the display is being shown. The on-off switch can also be connected to each of the receiving units to be activated, e.g. by a coin operated switch.

The receiving unit 18 is comprised of a control unit 38, an earphone 30, and a switch 32 activated by coins inserted through a coin slot 34. In operation, a user deposits a coin in the coin slot 34 which activates the switch 32. (Note that if the playback unit is not operating, activation of the switch 32 also starts the playback unit.) Transmission line 36 signals the control unit 38 and a timer in the control unit begins its timing cycle. Activation of the timer signals the control unit to transmit the next message recorded on the message channel 40 (being received by the control unit through line 24). The control unit 38 receives repeated start-stop signals 44 recorded on the other channel of the tape 20 through transmission line 26. Upon receiving the start-stop signal after the timing cycle is started the control unit connects the transmission line 24 with transmission lines 42a and 42b to transmit the messages 40 to the earphone 30. When the timing cycle is completed the subsequent detection of the start-stop signal 44 causes the control unit to interrupt transmission of the messages 40.

The electronics in the control unit for achieving the operation just described are schematically illustrated in FIG. 3. It will be understood that the components incorporated in the control unit 38 are standard items available to the electronics industry. Also it will be understood that the circuitry involved is within the capabilities of a person skilled in electronics and thus only a schematic representation is necessary to achieve full disclosure of the invention. As noted in FIG. 3, the signal transmitted through transmission line 36 to the control unit 38 is received by a timer 46. The timer signals an AND gate logic detector 48. The start-stop signal transmitted through line 26 to the control unit is received by an end-of-sentence-trigger-signal-detector 50 which repeatedly signals the AND gate logic detector 48 at the end of each message 40. The AND gate logic detector 48 upon receiving the sequential signals from the timer 46 and then the detector 50 transmits an on signal to an audio on-off switch 52. Upon completion of the timing cycle, the timer 46 signals a second AND gate logic detector 54. The detector 50 is similarly repeated signaling this second AND gate logic detector 54 as to the completion of the messages 40, i.e. by detecting the start-stop signals 44. Upon receiving the sequential signals from the timer at the completion of the timing cycle and then the detector 50 at the completion of a message the detector 54 transmits an off signal to the audio on-off switch 52.

Whereas persons skilled in the art of audio information devices and the electronics therefore will be capable of numerous variations and modifications to the embodiment of the invention described above, it is to be understood that the invention is not limited by this description, but encompasses the scope of the appended claims. For example, the electronics contained in the control unit can be reduced to a circuit board as is known to the electronics art and easily housed in the playback unit. The required multiple of circuit boards could be added as necessary without undue complication and the beneficial result is the reduced wiring between the playback unit and the receiving unit.

What is claimed is:

1. An audio information device comprising: a recording tape play back unit adapted to play a tape having messages and start-stop signals recorded thereon, said start-stop signals indicating the beginning and end of the messages, a read out head in said play back unit adapted to read off the messages and start-stop signals recorded on the recording tape, a multiple of control units electronically connected to the read out head to receive the messages and start-stop signals on the tape, an audio receiver electronically connected to each control unit and each control unit including transmission control means to connect and disconnect the transmission of the messages being received from the play back unit to the audio receiver, and a switch electronically connected to each control unit that is available to a user of the device to signal the control unit to transmit said messages, and said transmission control means of each control unit being responsive to the sequential transmit signal received from the switch and the start signal received from the play back unit to connect transmission of the messages to the audio receiver, and said transmission control means of each control unit being subsequently responsive to the stop signals received from the play back unit to disconnect the transmission of the messages to the audio receiver, said transmission of the messages and start-stop signals from the play back unit to the control units being continuous during the connect and disconnect operations of the transmission control means of any one control unit whereby the control units connected to the play back unit can operate independent of each other.

2. An audio information device as defined in claim 1 wherein a timer having a predetermined timing cycle is contained in each control unit, said timing cycle of the timer being activated by the transmit signal from said switch, and said transmission control means being responsive to the sequential signal from the timer indicating completion of the timing cycle and the stop signal from the play back unit to disconnect the transmission of the messages to the audio receiver.

3. An audio information device as defined in claim 1 wherein the recording tape play back unit is adapted to play a dual channel tape having messages recorded on one channel and start-stop signals recorded on the other channel, and said user controlled switch of each control unit being activated by the deposit of a coin in a coin slot to initiate the transmit signal to the control unit.

4. An audio information device comprising; an endless loop dual channel recording tape play back unit, a read out head in said play back unit adapted to read off the information recorded on the dual channels of a recording tape mounted in said play back unit, a control unit electronically connected to the read out head to receive the information from the dual channels of the tape, an audio receiver electronically connected to the control unit and a switch electronically connected to the control unit that is available to a user of the device to signal the control unit to transmit the messages contained on one of the channels of the recording tape to the audio receiver, said control unit including a timer that receives the transmit signal from the switch and in response to the signal starts a timing cycle, first and second AND gate logic detectors receiving start-stop signals from the other channel of the recording tape, said first AND gate logic detector receiving the transmit signal from the switch as activated by the user and being responsive to the next succeeding start signal from the recording tape to connect transmission of the message from said one channel of the recording tape to the audio receiver, and said second AND gate logic detector receiving a signal from the timer activated by completion of the timing cycle and being responsive to the next succeeding stop signal from the recording tape to disconnect transmission of the message from said one channel of the recording tape to the audio receiver.

* * * * *